Oct. 25, 1960    L. H. RICHARDSON    2,957,404
TORTILLA HOLDER
Filed Nov. 4, 1958    2 Sheets-Sheet 1
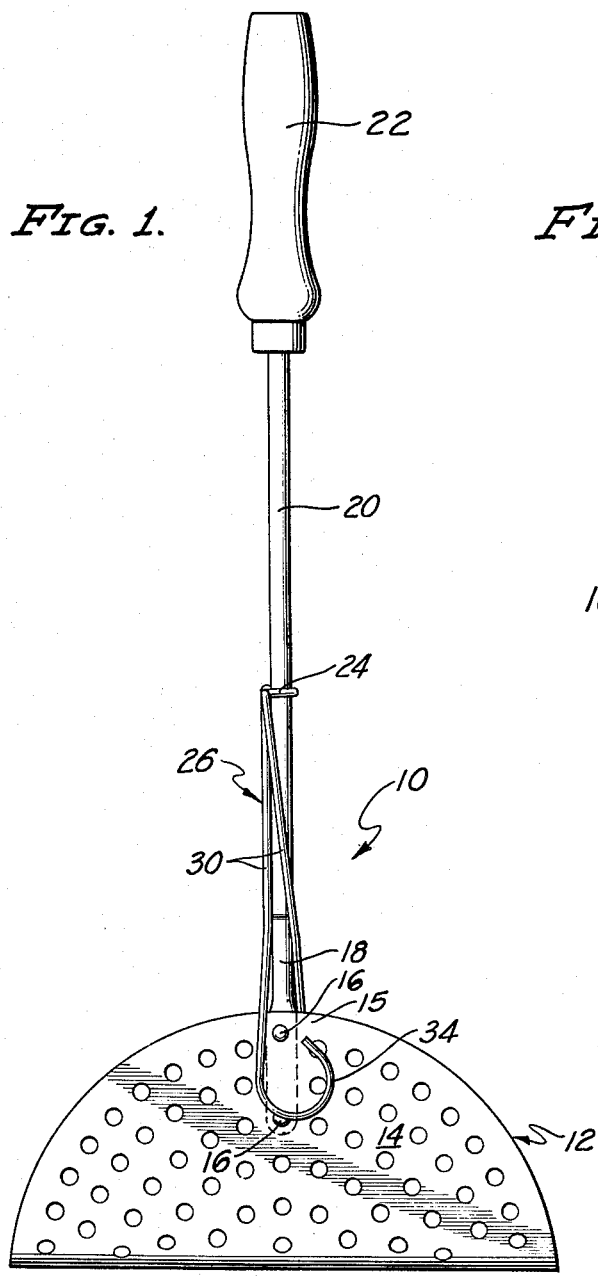
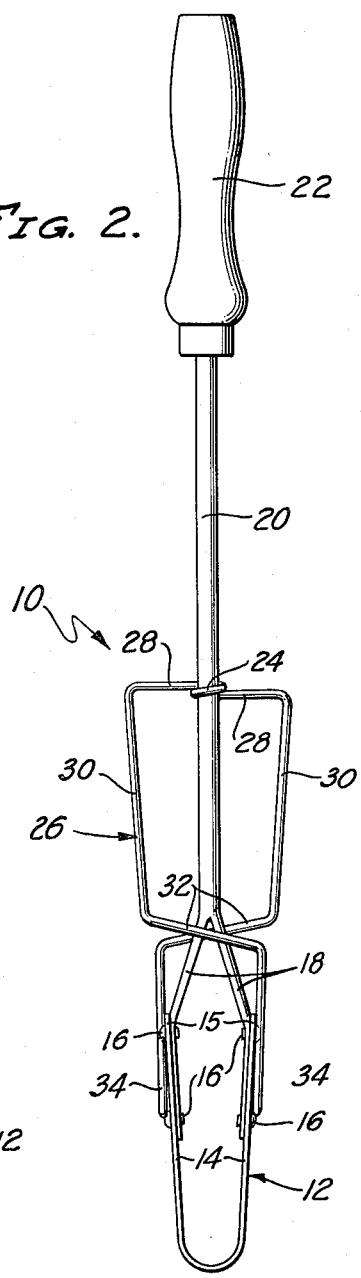
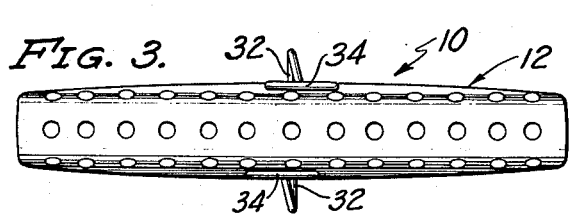
LELAND H. RICHARDSON
INVENTOR.
BY
ATTORNEY Oct. 25, 1960     L. H. RICHARDSON     2,957,404
TORTILLA HOLDER
Filed Nov. 4, 1958                    2 Sheets-Sheet 2
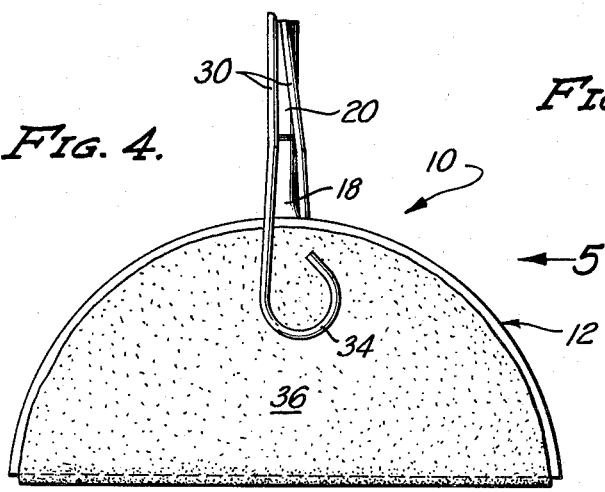
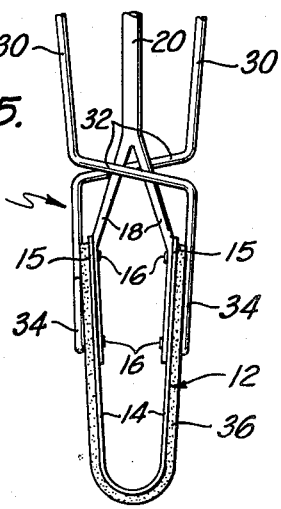
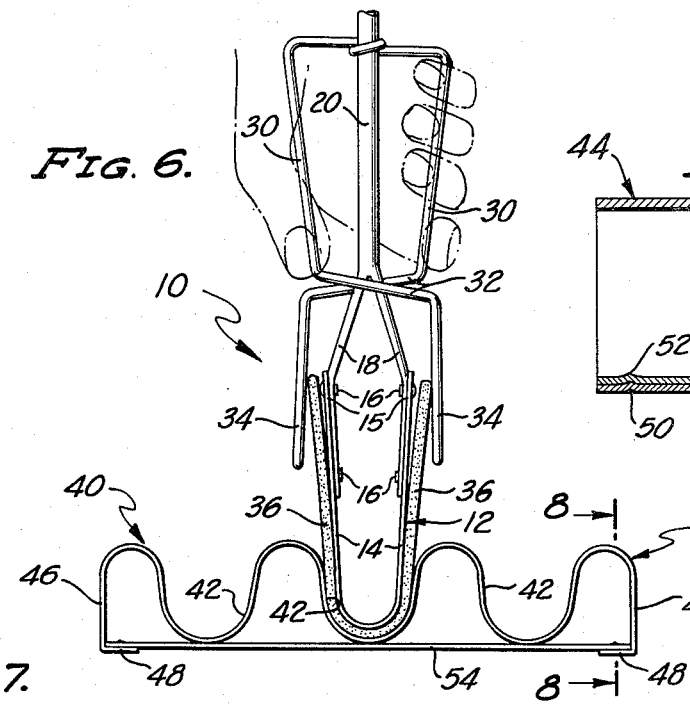
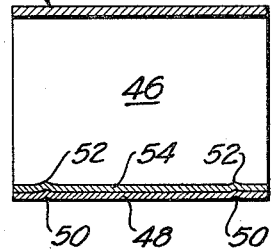
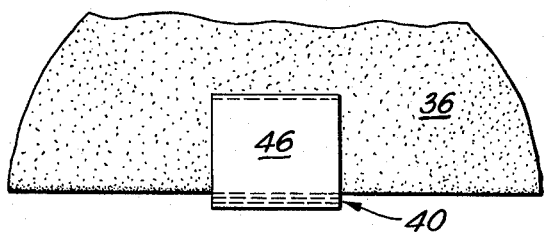
LELAND H. RICHARDSON
INVENTOR.
BY
ATTORNEY United States Patent Office 2,957,404
Patented Oct. 25, 1960

2,957,404
TORTILLA HOLDER

Leland H. Richardson, 3625 W. Oaks St., Fullerton, Calif.

Filed Nov. 4, 1958, Ser. No. 771,809

1 Claim. (Cl. 99—426)

This invention pertains to new and improved tortilla holders.

In the preparation of tacos, a type of Latin-American dish in some ways related to a sandwich, it is necessary to bend a tortilla about its diameter to a generally U-shaped configuration, and to fry this tortilla in this configuration so that it becomes crisp and edible. It is possible to fry a tortilla in this general shape using a common type pan, such as the skillet, and using a hand-manipulated instrument such as a fork. This general type of procedure is somewhat disadvantageous for several reasons. One of these is that it is comparatively difficult to adequately hold a tortilla to its desired final shape during the frying operation. Another disadvantage of this essentially manual procedure is that an individual carrying out the process of frying the tortilla is apt to become burned with splattering grease or the like. It is also comparatively difficult to remove from a pan the tortilla once the frying operation has been completed.

In order to simplify the frying of tortillas for tacos a number of different types of tortilla holders have been invented in the past. These devices tend to be undesirable because of a number of different factors. Frequently these devices are comparatively complex and, hence, are comparatively expensive when sold. Also, frequently these tortilla holders are mechanically somewhat complex to operate. The average individual preparing tacos desires to use a tortilla holder which is as simple to operate as possible. Further, many of the prior tortilla holders are disadvantageous because of problems pertaining to the manner in which a tortilla is held in place with them, and pertaining to the manner in which a tortilla is removed from them while the tortilla itself is exceedingly hot immediately following the frying operation.

A broad object of the present invention is to provide a new and improved type of tortilla holder. A related object of the present invention is to provide a tortilla holder which is comparatively simple in structural detail. A related object of the present invention is to provide tortilla holders which may be easily and conveniently manufactured at a very nominal cost. Another related object of the present invention is to provide tortilla holders which may be easily and conveniently used by any individual and from which a tortilla may be removed with a minimum of difficulty.

These and other objects of the present invention will be fully apparent to those skilled in the art to which this invention pertains from a detailed consideration of the remainder of this description, including the appended claim and the acompanying drawings in which:

Fig. 1 is a top plan view of a tortilla holder of the present invention;

Fig. 2 is a side view of this tortilla holder;

Fig. 3 is an end view of this tortilla holder;

Fig. 4 is a view corresponding to Fig. 1 illustrating the manner in which a tortilla is held in place on tortilla holders of this invention;

Fig. 5 is a side view taken in the direction of the arrow 5 in Fig. 4 of the drawings;

Fig. 6 is a side view indicating the manner in which a tortilla may be discharged from a tortilla holder of the present invention into a rack designed to support such a tortilla;

Fig. 7 is a side elevational view of a fried tortilla held within this rack, and Fig. 8 is a cross-sectional view taken at line 8—8 of Fig. 6 of the drawing.

In all figures of the drawings like numerals are used to designate like parts. It is to be understood that the present invention is not to be taken as being limited by the accompanying drawings. Those skilled in the art to which this particular invention pertains will realize that differently appearing tortilla holders may be manufactured which utilize the essential type of action or features of the present invention.

As an aid to understanding the invention it is stated in essentially summary form that it pertains to tortilla holders, each of which utilizes a perforate supporting plate or member bent along its diameter to a generally U-shape. From such a member there extends an elongated handle, or rod, to the extremity of which there is attached a handle. Further with the tortilla holders of the present invention, clip means are movably supported on the rod in such a manner that these clip means may be actuated so as to engage the exterior of a tortilla held upon the perforate member used.

The actual nature of tortilla holders of this invention is best more fully explained by referring directly to the accompanying drawings. In Fig. 1 there is shown a tortilla holder of the present invention 10 which includes a perforated circular plate 12, this plate having been bent to a generally U-shape along its diameter. The extremities or ends 15 of the sides 14 of the plate 12 are connected by means of rivets 16 to branches 18 of a bifurcated rod 20. As can be seen from Figs. 1 and 2 of the drawing the principal portion or shank of this rod 20 has a uniform, smooth cross-sectional configuration. At the end of the rod 20 remote from the plate 12 there is attached a conventional handle 22 which is used in supporting the entire tortilla holder 10 as a tortilla is being fried with it.

The rod 20 extends through a loop 24 formed in a complete resilient wire clip 26, in such a manner that the clip 26 is capable of being slid along the length of the rod 20. The clip 26 is formed to include branches, each of which includes a section 28 extending at right angles to the axis of the rod 20 and each of which also includes a section 30 extending generally parallel to the rod 20, a section 32 extending across the bifurcated end of the rod 20, and terminal loops 34. These loops can be considered extremities of the clip 26.

During the use of the tortilla holder 10 the sections 30 of the clip 26 are pressed toward one another causing the loops to move away from the plate 12. At this point a tortilla 36 may be wrapped around the plate 12 so as to extend in the general position indicated in Figs. 4, 5 and 6 of the drawings. The sections 30 are then released causing the loops 34 of the clip 26 to resiliently engage this tortilla 36 firmly holding it in place along the plate 12.

At this point the entire tortilla holder 10, holding the tortilla 36 may be dipped in appropriate container of hot grease so as to fry the tortilla 36 to the desired shape. The holes within the plate 12 permit grease to permeate substantially the entire interior of the tortilla 36 during this operation so that it is adequately cooked or fried. As the operation is continued the complete holder 10 may be held by the handle 22.

After the cooking operation is completed the holder 10 is preferably removed to an appropriate rack such as the rack 40 shown in Fig. 6 of the drawing. At this point the tortilla 36 is held generally within a notch 42 within the rack 40 as indicated by means of the holder 10. Next the sections 30 of the clip 26 are engaged and brought toward the rod 20 so as to cause the loops 34 to disengage the tortilla 36. At this point the tortilla is free from the holder 10 and the holder 10 may be removed so as to be used again. If, for any reason, the tortilla should stick upon the plate 12 it is possible to slide the clip 26 along the rod 20 and to push this tortilla from the plate 20 with the ends of the loops 34.

The construction of the rack 40 is considered to be quite advantageous. This rack, as indicated, contains a first member 44 having a plurality of upwardly facing notches 42 and contains parallel L-shaped ends 46, the extremities 48 of each of which is provided with upstanding bumps 50. These bumps are adapted to latch within corresponding depressions 52 in a second member or base plate 54 so that the plate 54 bears against the bottom of the notches 42. This entire construction is designed so that the entire rack may be easily assembled by slipping the base plate 54 in place. When so assembled the entire rack is held together through the inherent resiliency of material from which it is made. The base plate 54 may be easily removed for cleaning purposes.

Those skilled in the art will realize that tortilla holders as herein described are exceedingly efficient for the purpose described and that these tortilla holders are comparatively inexpensive to manufacture. They will further realize that tortilla holders, such as the holder 10, need not be used with a rack such as the rack 40, but may be used so as to deposit tortillas upon any sort of supporting surface or upon a shelf as may be desired in use. Because of the nature of this invention and the fact a number of differently appearing tortilla holders using the essential features and principles inherent in the holder 10 may be constructed, the invention is to be considered as being limited only by the appended claim forming a part of this disclosure.

I claim:

A tortilla holder which comprises: a perforated circular plate, said plate being curved along its diameter to a generally U shape so as to have ends spaced from said bend, and so as to have sides; a bifurcated rod, the ends of each of the branches of said rod attached to an end of said plate, said rod having a smooth shank; a handle attached to said rod at the extremity thereof remote from said plate; and a wire clip, said clip having a loop formed in the center thereof, said loop fitting around said rod, said clip also including branches, each of said branches extending from said loop to one side of said rod and then extending generally parallel to said rod to adjacent to one side of said plate and then extending along the bifurcated portion of said rod to the other side of said plate, and terminating in a loop fitting against the other side of said plate, said branches extending from opposite sides of said loop in the center of said rod, said clip holding said loops in said branches against the sides of said plate.

References Cited in the file of this patent

UNITED STATES PATENTS

| | | |
|---|---|---|
| 2,592,203 | Snyder | Apr. 8, 1952 |
| 2,741,901 | Silos | Apr. 17, 1956 |
| 2,775,929 | Johnson et al. | Jan. 1, 1957 |
| 2,792,774 | Veach | May 21, 1957 |
| 2,814,981 | Wendell | Dec. 3, 1957 |
| 2,821,307 | Linsley | Jan. 28, 1958 |
| 2,847,933 | Pate | Aug. 19, 1958 |